Patented Aug. 7, 1951

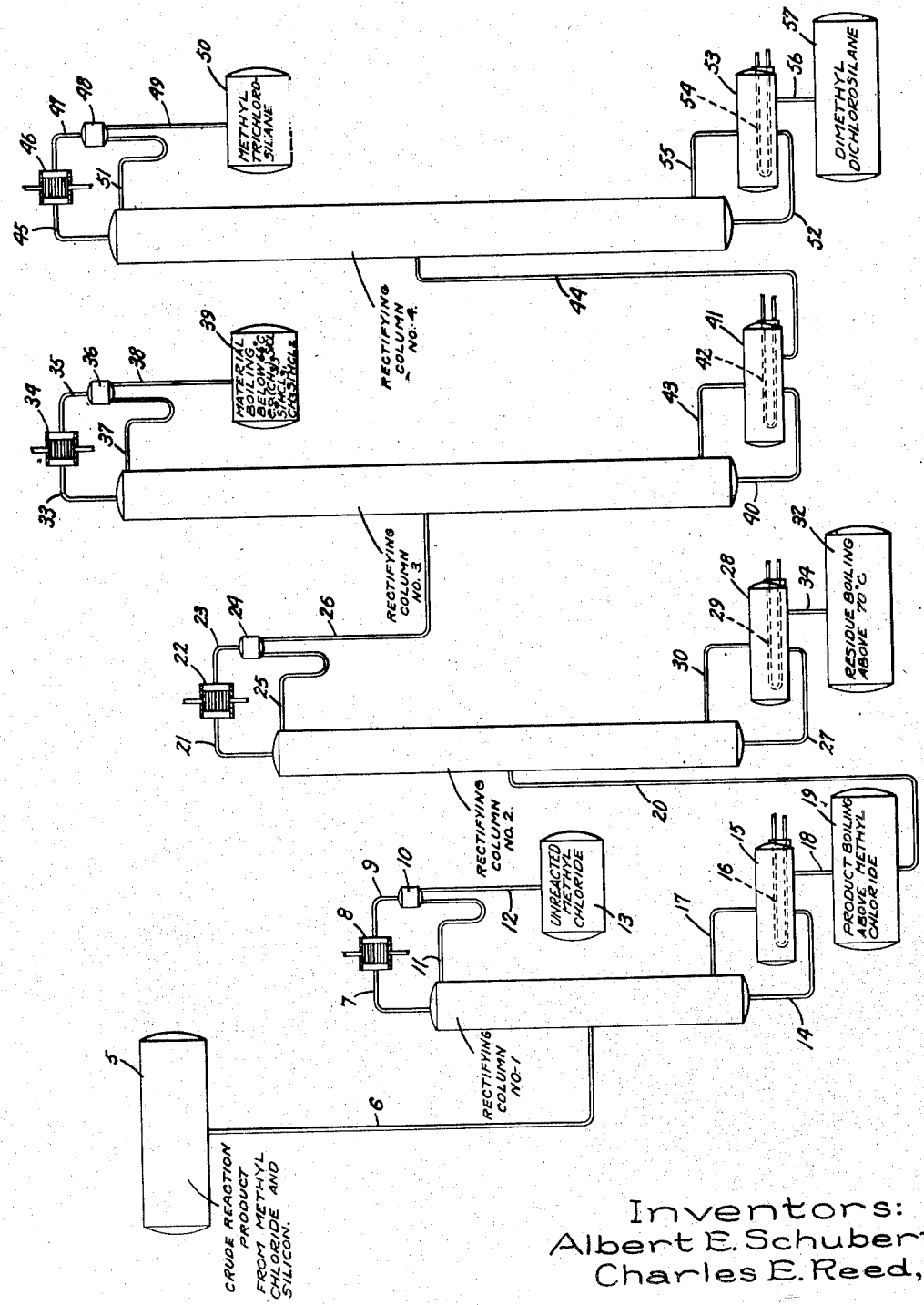

2,563,557

UNITED STATES PATENT OFFICE 2,563,557

RECTIFICATION OF METHYLCHLOROSILANES

Albert E. Schubert, Schenectady, N. Y., and Charles E. Reed, Pittsfield, Mass., assignors to General Electric Company, a corporation of New York Application October 20, 1948, Serial No. 55,448

2 Claims. (Cl. 202—40)

This invention relates to the rectification of liquid products comprising a mixture of methylchlorosilanes. The invention is particularly directed to a process for recovering essentially pure dimethyldichlorosilane from a crude reaction product obtained as the result of the passage of methyl chloride over heated silicon in the presence of a catalyst as is more specifically disclosed and claimed in Rochow Patent 2,380,995, issued August 7, 1945, and assigned to the same assignee as the present invention.

One of the objects of this invention is to provide a method of rectification whereby essentially pure dimethyldichlorosilane is produced.

Another object is to obtain essentially pure dimethyldichlorosilane from a crude reaction product comprising a mixture of methylchlorosilanes by a continuous process employing a minimum amount of equipment and operations.

Other objects of the invention will become more apparent from the description thereof which follows.

In the passage of methyl chloride over heated silicon, this particular process being described more specifically in the aforementioned Rochow patent, there is obtained a crude mixture of chemical compounds which may be considered as comprising essentially the following materials. For convenience and for further reference in the description of this invention, the table below enumerates these various compounds and classifies them into several fractional categories:

Table 1

| | Compound | Formula | Boiling Point at 760 mm. |
|---|---|---|---|
| Frac. 1 | Hydrogen | $H_2$ | −253 |
| | Methane | $CH_4$ | −161 |
| Frac. 2 | Methyl chloride | $CH_3Cl$ | −23.7 |
| Frac. 3 | Silicon tetramethyl | $Si(CH_3)_4$ | 26.6 |
| | Trichlorosilane | $SiHCl_3$ | 31.8 |
| | Methylhydrogendichlorosilane | $CH_3SiHCl_2$ | 41.0 |
| | Silicon tetrachloride | $SiCl_4$ | 57.6 |
| | Trimethylmonochlorosilane | $(CH_3)_3SiCl$ | 57.7 |
| Frac. 4 | Methyltrichlorosilane | $CH_3SiCl_3$ | 66.1 |
| Frac. 5 | Dimethyldichlorosilane | $(CH_3)_2SiCl_2$ | 70.0 |
| Frac. 6 | Methylvinyldichlorosilane | $CH_3SiC_2H_3Cl_2$ | 92.3 |
| | Higher boiling organochlorosilanes and hydrocarbons | | >92.3 |

It will be apparent from an examination of the boiling points of the various compounds listed above that there is a slight gradient in boiling points of trimethylchlorosilane, methyltrichlorosilane, dimethyldichlorosilane, and silicon tetrachloride. Because of this small difference in boiling points, especially between silicon tetrachloride and trimethylchlorosilane, and methyltrichlorosilane and dimethyldichlorosilane, great difficulty has been experienced in separating the different components.

It has been suggested that batch fractional distillation might be one method of obtaining the desired pure dimethyldichlorosilane. However, this method results in lower yields of the desired dimethyldichlorosilane, is more costly as regards the time required for obtaining the desired product, and finally this method, as will be apparent to those skilled in the art, is inherently expensive.

We have now discovered that we can obtain dimethyldichlorosilane in an essentially pure state from the crude reaction product resulting from the passage of methyl chloride over heated silicon by means of continuous rectification which employs moderate reflux ratios and a small number of rectifying columns. The dimethyldichlorosilane obtained is essentially pure and contains at most not more than about 0.5 per cent, by weight, of methyltrichlorosilane as the impurity. This essentially pure dimethyldichlorosilane is required in the manufacture of silicone oils and rubbers which can tolerate up to about 0.5 per cent methyltrichlorosilane in the intermediate product without materially affecting the properties of the final product.

The product separated from the essentially pure dimethyldichlorosilane consists of methyltrichlorosilane containing about 5 to 10 per cent of dimethyldichlorosilane as the impurity. This mixture of methylchlorosilanes can be used and blended with other materials in the preparation of silicone resins.

Our new process of rectification operates with sufficient accuracy to obtain a product which eliminates the major part of the difficulties in producing essentially pure dimethyldichlorosilane from the reaction product obtained as the result of the reaction between methyl chloride and heated silicon. In addition to obtaining a product of high purity, the product is obtained in excellent yield. Finally, there are very small losses of the dimethyldichlorosilane as compared to losses realized by the use of other means for separating dimethyldichlorosilane from the crude reaction product.

In accordance with our process, the above-described crude reaction product is heated and continuously led into a rectifying column from which is obtained as an overhead product (i. e., obtained as low boiler from the top of the column) a mixture of materials boiling below silicon tetramethyl (26.6° C.) and including methyl chloride, methane and hydrogen. Thereafter the bottoms product is heated and continuously rectified in another rectifying column whereby as an overhead product there is removed that portion of the composition boiling at or below the boiling point of dimethyldichlorosilane, namely, silicon tetramethyl, trichlorosilane, methyldichlorosilane, silicon tetrachloride, trimethylchlorosilane, methyltrichlorosilane and dimethyldichlorosilane.

The overhead product boiling at or below the boiling point of dimethyldichlorosilane is again heated and continuously rectified in another rectifying column so as to remove as an overhead cut that portion of the product boiling below the boiling point of methyltrichlorosilane (66° C.). The bottoms product which consists essentially of a binary mixture of methyltrichlorosilane and dimethyldichlorosilane is heated and in turn led into a rectifying column and continuously rectified into an overhead product containing essentially all the methyltrichlorosilane and a small amount of dimethyldichlorosilane and a bottoms product which is substantially pure dimethyldichlorosilane.

The accompanying drawing is a diagrammatic illustration of an arrangement of an apparatus suitable for conducting the present invention. Further advantages and modifications of our invention will become more apparent in the following description of the drawing.

Rectifying columns numbers 1, 2, 3 and 4 are arranged in sequence order so as to provide for a continuous passage of products through the system.

The crude reaction product which is obtained from the reaction between methyl chloride and heated silicon in the presence of a catalyst is accumulated and stored in a tank 5 which is connected by a feed pipe 6 to rectifying column number 1 to which the crude reaction product is fed continuously. Rectifying column number 1 is preferably operated at such a pressure (e. g., 90 p. s. i. gauge) that methyl chloride vapor can be condensed to liquid at the temperature of ordinary cooling water. The low boiling material including the methyl chloride and the materials boiling below methyl chloride pass through a vapor line 7 into a condenser 8 and thereafter are led through another pipe 9 to an accumulator 10 from which part of the methyl chloride is withdrawn through another pipe 12 and stored in a tank 13. Part of the overhead condensate is recirculated from the accumulator through a pipe 11 back to the rectifying column and is used as reflux for column number 1. The higher boiling materials in the feed flow from the bottom of column 1 by means of an outlet pipe 14 to a reboiler 15. Part of this liquid entering the reboiler is vaporized by heat supplied by a heating element 16, and this vapor is returned to rectifying column 1 by means of an inlet pipe 17. That portion of the liquid entering the reboiler which is not vaporized is withdrawn from the reboiler through pipe 18 to a tank 19. This withdrawal is accomplished by operating reboiler 15 at constant liquid level.

Tank 19 functions as an intermediate tank for feeding the liquid contained therein through another pipe 20 to rectifying column number 2. The overhead vapor is removed through a pipe 21 and passes through a condenser 22 and thence to another accumulator 24 by means of a line 23. This accumulator 24 acts to direct a portion of the crude reaction product boiling above methyl chloride and up to and including dimethyldichlorosilane to rectifying column number 3. A pipe 25 returns some of this latter boiling material from the accumulator to rectifying column 2 for reflux in the column. As a bottoms product in rectifying column 2 there is obtained that portion of the reaction product boiling above dimethyldichlorosilane. This product is removed from reboiler 28, which is operated in exactly the same fashion as reboiler 15, and parts 27, 28, 29, 30 and 31 function similarly as do parts 14, 15, 16, 17 and 18, respectively. The liquid removed from the reboiler 28 is stored in a tank 32.

That portion of the reaction product boiling above methyl chloride and up to and including dimethyldichlorosilane is then conducted to rectifying column number 3 by a pipe 26. As an overhead product from rectifying column 3 there is obtained that portion of the crude reaction product boiling above methyl chloride and below methyl trichlorosilane. This product is removed from accumulator 36 and parts 33, 34, 35, 36, 37 and 38 of rectifying column 3 function in a manner exactly similar to parts 7, 8, 9, 10, 11 and 12 of rectifying column 1, respectively. The product is stored in a tank 39.

The bottoms product from rectifying column number 3 consists essentially of a binary mixture of methyltrichlorosilane and dimethyldichlorosilane. This binary mixture is removed from the reboiler 41, and the assembly designated by parts numbered 40, 41, 42 and 43 at the bottom of rectifying column number 3 operates in essentially the same manner as corresponding parts 14, 15, 16 and 17 of rectifying column number 1.

The binary mixture of methyltrichlorosilane and dimethylidichlorosilane is fed through a pipe 44 to rectifying column number 4. The vapor from the top of the column, which comprises essentially methyltrichlorosilane and a small amount of dimethyldichlorosilane (of the order of about 10 per cent), flows through a pipe 45 to a condenser 46, in which it is condensed to liquid. This liquid flows through a pipe 47 to an accumulator 48, from which a portion is returned through a pipe 51 as reflux to rectifying column number 4, and the remainder is withdrawn through a pipe 49 and stored in a tank 50. The contents of tank 50 consist essentially of all the methyltrichlorosilane contained in the original crude reaction product which was fed to rectifying column number 1.

The liquid from the bottom of rectifying column number 4 flows to a reboiler 53 through a pipe 52. This reboiler is suitably heated by a heating element 54, and the vapor generated is returned through a pipe 55 to rectifying column number 4. That portion of the liquid flowing to the reboiler which is not vaporized is removed through a pipe 56 and stored in a tank 57. This product which is obtained in tank 57 consists of essentially pure dimethyldichlorosilane containing a maximum of a fraction of one per cent of methyltrichlorosilane as an impurity.

From the foregoing description, it is clearly apparent that the method described by the accompanying drawing provides for continuous separation of essentially pure dimethyldichlorosilane from the crude reaction product obtained as a result of the reaction between methyl chloride and heated silicon and may be connected directly to the exit end of the apparatus used for effecting the aforementioned reaction.

In order that those skilled in the art may better understand how the present invention may be practiced, the following example is given by way of illustration and not by way of limitation.

*Example*

A crude reaction mixture obtained by the passage of methyl chloride over heated silicon in the presence of copper as a catalyst and comprising approximately 4 per cent methyl chloride, 8 per cent boiling above methyl chloride and below 66.1° C. (hereinafter referred to as Fraction 3), 12 per cent methyltrichlorosilane, 67 per cent dimethyldichlorosilane, and 9 per cent boiling above 70° C. (hereinafter referred to as Fraction 6) was fed continuously (see accompanying drawing) to a rectifying column operated under sufficient pressure (about 90 p. s. i. gauge) to effect the condensation of the gaseous methyl chloride to liquid methyl chloride in the condenser. The overhead product which was being continuously withdrawn from this column was found by analysis to be essentially free of compounds containing hydrolyzable chlorine. This indicated that substantially none of the components in the feed boiling above methyl chloride were withdrawn with the overhead product.

The bottoms product from this first column was withdrawn (analysis showed it to be free of methyl chloride) heated and fed continuously into another rectifying column. This bottoms product comprised the following materials in the stated per cents by weight:

| | Per cent |
|---|---|
| Fraction 3 (see Table 1) | 7.6 |
| Methyltrichlorosilane | 12.2 |
| Dimethyldichlorosilane | 67.6 |
| Fraction 6 (see Table 1) | 10.1 |
| Loss | 2.8 |

The overhead product obtained from the last rectifying column and containing a mixture of chlorosilanes boiling up to and including the boiling point of dimethyldichlorosilane (70° C.) was removed, heated, and cycled to another rectifying column. The remaining bottoms product was a high boiling material identified as Fraction 6 which on analysis was found to contain about 1.6 per cent dimethyldichlorosilane, this amount being necessarily taken with the bottoms product of the column in order to prevent any of the high boiling materials in Fraction 6 from being removed in the overhead product. The effectiveness with which the high boiling constituents were prevented from contaminating the overhead product was indicated by the fact that analysis of the material boiling between 80° to 110° C. showed that there was at most 0.23 per cent hydrolyzable chlorine.

The overhead product separated from the high boilers was fed continuously into a rectifying column and that portion boiling below 66° C. (Fraction 3) was removed as the overhead product leaving behind as the bottoms product a binary mixture of about 83 per cent, by weight, dimethyldichlorosilane and about 17 per cent, by weight, methyltrichlorosilane. About 90 per cent of the overhead product analyzed for material boiling below the boiling point of methyltrichlorosilane and about 7 per cent methyltrichlorosilane, the balance of material being accounted for by handling losses.

The binary mixture of methyltrichlorosilane and dimethyldichlorosilane was continuously fed into a rectifying column which produced as its overhead product a cut consisting essentially of all the methyltrichlorosilane and a bottoms product consisting substantially of pure dimethyldichlorosilane. Due to the comparatively narrow boiling point range of the two components of the binary mixture, it is difficult to produce effectively an overhead cut substantially free of dimethyldichlorosilane and a bottoms cut free of slight traces of methyltrichlorosilane. Under practical operating conditions with a practical number of theoretical plates installed in the last rectifying column, it was found possible to make simultaneously products analyzing about 90 per cent methyltrichlorosilane in the overhead product and 99.5 per cent dimethyldichlorosilane in the bottoms product.

By means of our invention, we can produce an acceptably pure dimethyldichlorosilane which can be employed without further purification as an intermediate in the production of silicone oils and rubbers which in the final form are organopolysiloxanes having an average of from about 1.95 to about 2.0 organic groups per silicon atom in the polysiloxane chain. In order to obtain this ratio of organic groups to silicon atoms, it is necessary that the starting hydrolyzable material contain essentially the same ratio of organic groups to silicon atom. The further requirement being that the remaining atoms or radicals attached directly to the silicon atom are hydrolyzable.

From the foregoing description, a great many advantages of our invention will be apparent to those skilled in the art. Many of these have been referred to in detail above. Many of the quantitative advantages will not be discussed in great detail because of the complexity of the calculations involved. Among the more general qualitative advantages are the following. The invention makes possible an essentially clean separation of dimethyldichlorosilane from the crude reaction product and from the methyltrichlorosilane which has not heretofore been very successful to the best of our knowledge. The particular essence of our invention resides in the express methods whereby certain groups of contaminating materials are removed in specified sequences so as to obtain readily a clean separation of extremely pure dimethyldichlorosilane in an economical fashion with maximum yield while at the same time requiring a minimum of operating steps and equipment.

What we claim as new and desire to secure by Letters Patent of the United States is:

1. The process of isolating substantially pure dimethyldichlorosilane from a crude reaction mixture comprising the product of reaction between heated silicon and methyl chloride in the presence of a catalyst, which process comprises (1) continuously rectifying the crude reaction product to remove a distillate consisting essentially of all material boiling below and including methyl chloride, (2) continuously rectifying the mixture of materials boiling above methyl chloride into two fractions consisting essentially of (a) a fraction boiling at or below the boiling point of dimethyldichlorosilane and (b) a fraction boiling above dimethyldichlorosilane, (3) feeding the fraction containing materials boiling above methyl chloride and up to and including dimethyldichlorosilane through a rectifying column and removing as an overhead product all materials having a boiling point below methyltrichlorosilane, and (4) continuously feeding the bottoms product consisting essentially of a binary mixture of dimethyldichlorosilane and methyltrichlorosilane to another rectifying column and removing as an overhead product methyltrichlorosilane containing a small amount of dimethyldichlorosilane, and removing as a bottoms product essentially pure dimethyldichlorosilane containing a fraction of one per cent of methyltrichlorosilane as an impurity.

2. The process of obtaining essentially pure dimethyldichlorosilane in a continuous manner from a reaction mixture comprising the product of reaction of methyl chloride and heated silicon, which process comprises (1) removing methyl chloride and all material boiling below methyl chloride as an overhead product from the crude reaction product by continuous rectification in a column, producing simultaneously a bottoms product composed of the crude constituents boiling above methyl chloride, (2) rectifying the bottoms product continuously into an overhead cut consisting essentially of the remaining crude constituents boiling at 70° C. and below, and a bottoms cut consisting essentially of the material boiling above 70° C., (3) separating the crude boiling at 70° C. and below by continuous rectification into an overhead product boiling below 66° C. and a bottoms product consisting essentially of a binary mixture of methyltrichlorosilane and dimethyldichlorosilane, and (4) separating the binary mixture of methyltrichlorosilane and dimethyldichlorosilane by continuous rectification into an overhead product containing essentially all of the methyltrichlorosilane and a bottoms product which is substantially pure dimethyldichlorosilane containing less than 1 per cent methyltrichlorosilane as an impurity.

ALBERT E. SCHUBERT.
CHARLES E. REED.

REFERENCES CITED

The following references are of record in the file of this patent:

UNITED STATES PATENTS

| Number | Name | Date |
|---|---|---|
| 1,701,988 | Torrey et al. | Feb. 12, 1929 |
| 2,288,126 | Dunn et al. | June 30, 1942 |
| 2,370,948 | Gadwa | Mar. 6, 1945 |
| 2,380,995 | Rochow | Aug. 7, 1945 |
| 2,413,049 | Hyde | Dec. 24, 1946 |

OTHER REFERENCES

Robinson and Gillaland, Elements of Fractional Distillation, third edition, published 1939 by McGraw-Hill Book Company Inc., New York, New York, pages 244–249.